United States Patent [19]

Shinjo

[11] 4,407,620

[45] Oct. 4, 1983

[54] DRILL SCREW

[75] Inventor: Katsumi Shinjo, Osaka, Japan

[73] Assignee: Yugen Kaisha Shinjoseisakusho, Osaka, Japan

[21] Appl. No.: 210,979

[22] Filed: Nov. 28, 1980

[30] Foreign Application Priority Data

Dec. 29, 1979 [JP] Japan .............................. 54-172577

[51] Int. Cl.³ .......................................... F16B 25/00
[52] U.S. Cl. ................................................. 411/387
[58] Field of Search ................ 411/387, 386, 29, 378; 408/223, 224, 228, 229

[56] References Cited

U.S. PATENT DOCUMENTS

| | | | |
|---|---|---|---|
| 3,241,426 | 3/1966 | Gutshall | 411/387 |
| 3,395,603 | 8/1968 | Skierski | 411/387 |
| 3,463,045 | 8/1969 | Prescott | 411/387 |
| 3,710,676 | 1/1973 | Ringland | 411/387 |
| 3,738,218 | 6/1973 | Gutshall | 411/387 |
| 3,789,725 | 2/1974 | Lindstrom | 411/387 |
| 4,125,050 | 11/1978 | Schwartzman | 411/387 |

FOREIGN PATENT DOCUMENTS 1316157  5/1973  United Kingdom ............... 411/387

*Primary Examiner*—Robert L. Wolfe
*Attorney, Agent, or Firm*—Jordan and Hamburg

[57] ABSTRACT

A drill screw comprises an elongated threaded stem having a driving head at one end and a drill bit at the opposite end, the drill bit having a pair of axially extending flutes located oppositely with respect to the axis of the stem, each of the flutes having a cutting surface which is deviated from the axis, each of the cutting surfaces having an inwardly concave bottom with respect to an imaginary reference plane deviated from the axis but extending in parallel therewith, the cutting surface including a cutting edge formed by its front edge and a cutting blade formed by its side edge, wherein the cutting edge and blade are on the reference plane, and each of the cutting edge and blade having a rake formed by the cutting surface.

6 Claims, 5 Drawing Figures

DRILL SCREW

BACKGROUND OF THE INVENTION

1. Field of the Invention

The present invention relates to a drill screw for producing a threaded hole and allowing itself to anchor therein. More particularly, the present invention relates to a drill screw of such nature whose drill head or bit is shaped so as to allow the same to be cold forged.

2. Description of the Prior Art

In general, drill screws can be classified roughly into two types; the first type has a drill bit shaped by a cutting machine such as a milling machine, and the second type has a drill bit shaped under pinch pointing or cold forging. With increasing demands for drill screws, the second type tends to outnumber the first type because of its superior productivity and economy.

To increase the drilling capability most of the forged screws is shaped so as to have relief and twist in its cutting surface as is in conventional all-purpose drills. Examples of this type are disclosed in U.S. Pat. No. 3,079,831 and U.S. Pat. No. 3,241,426 (Japanese Patent Publication No. 45-24728). However, difficulties arise as to how to fabricate a molding die adapted to shape such configuration under cold forging. Even if it is well fabricated, the die cannot withstand a long use. A frequent replacement will be needed.

To overcome the difficulties pointed out above, there is a proposal for producing a flat cutting surface free from any relief and twist, wherein the cutting surface extends axially of the drill. This facilitates to fabricate a die and prolongs its life. Typical examples of this type are disclosed in U.S. Pat. No. 3,463,045 (Japanese Patent Publication No. 47-2562), U.S. Pat. No. 3,395,603 (Japanese Patent Publication No. 48-13139) and U.S. Pat. No. 3,710,676.

However, this proposal only aims at securing the easiness of fabricating a die, and fails to consider the function of a drill screw. As a result, the drill screws shaped in such dies must have a reduced drill capability.

The present invention is directed toward solving the problems pointed out with respect to the known drill screw and has for its object to provide an improved drill screw whose drill bit is uniquely shaped so as to allow the same to be cold forged without trading off its drilling function.

Other objects and advantages will become apparent from the following description given hereunder, it should be understood, however, that the detailed description and specific embodiments are given by way of illustration only, since various changes and modifications within the spirit and scope of the invention will become apparent to those skilled in the art from this description.

SUMMARY OF THE INVENTION

According to the present invention, a drill screw comprises an elongated threaded stem having a driving head at one end and a drill bit at the opposite end, the drill bit having a pair of axially extending flutes located oppositely with respect to the axis of the stem, each of the flutes having a cutting surface which is deviated from the axis, each of the cutting surfaces having an inwardly concave bottom with respect to an imaginary reference plane deviated from the axis but extending in parallel therewith, the cutting surface including a cutting edge formed by its front edge and a cutting blade formed by its side edge, wherein the cutting edge and blade are on the reference plane, and each of the cutting edge and blade having a rake formed by the cutting surface.

DETAILED DESCRIPTION OF THE INVENTION

Figure 1:
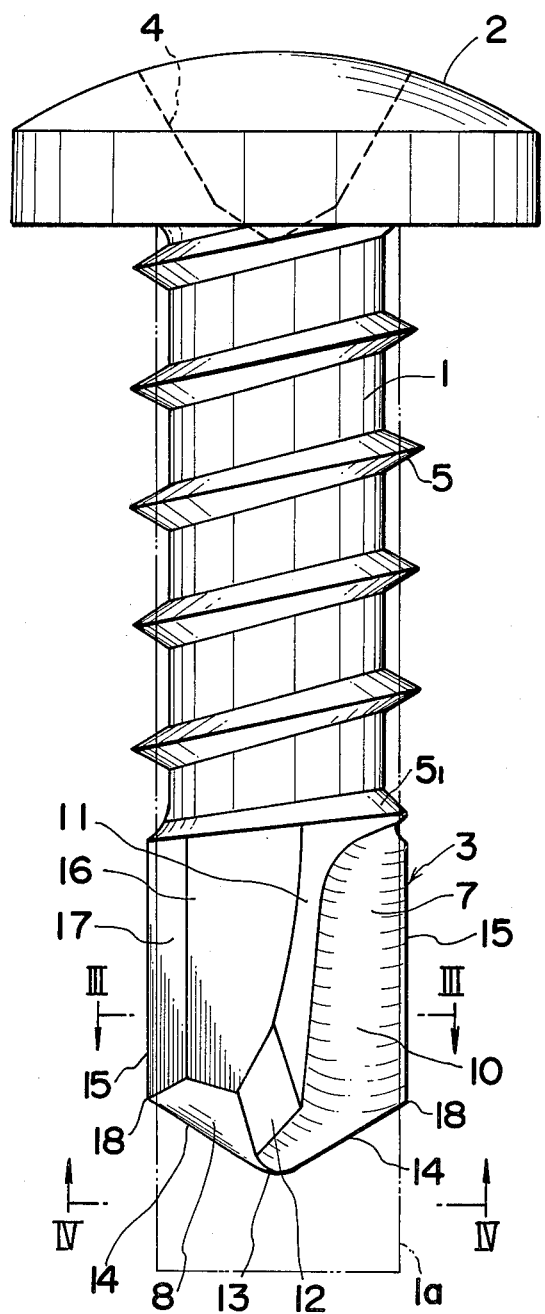
FIG. 1 is a front view showing a drill screw according to the present invention.
Figure 2:
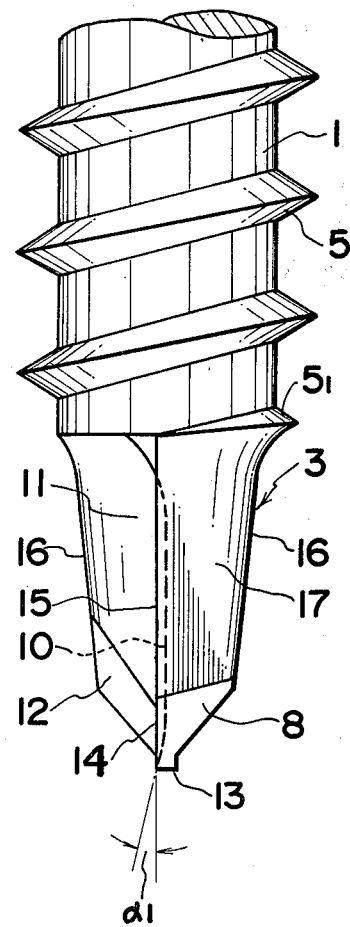
FIG. 2 is a front view particularly showing the drill bit and the stem.

As shown in FIG. 1, a drill screw according to the present invention includes an elongated threaded stem 1 having a driving head 2 at one end and a drill bit 3 at the opposite end. The driving head 2 includes a groove 4 adapted to receive a driving tool, such as a screw driver, whereby the drill screw is as a whole turned. The reference numeral 5 indicates threads spirally extending around the cylindrical surface of the stem 1, from the driving head 2 to the drill bit 3. The root diameter of the thread is smaller than the maximum diameter of the drill bit 3, but the outside diameter thereof is larger than the maximum diameter of the drill bit. The reference numeral $5_1$ indicates a thread portion located adjacent to the drill bit 3, which thread portion has a diminishing height so as to allow the threaded stem 1 to smoothly advance into the hole in the workpiece. The thread 5 is produced by a rolling process.

The drill bit 3 includes two flutes 7 and a pair of cutting lips 8. The flutes 7 extend axially of the drill screw, but each flute is located in opposite positions with respect to a dead center O. The cutting lips 8 also extend opposedly with respect to the dead center.

Figure 3:
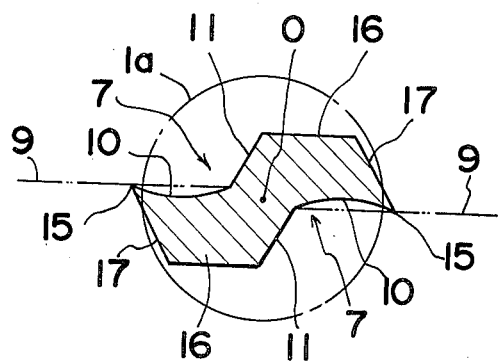
FIG. 3 is a cross-section taken along III—III in FIG. 1.
Figure 4:
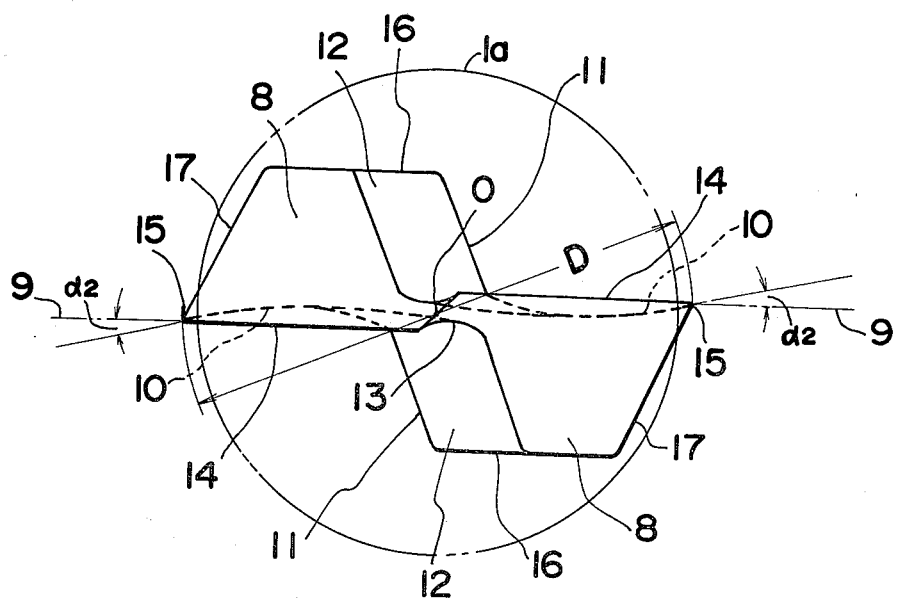
FIG. 4 is an enlarged end view of the drill screw, viewed along IV—IV in FIG. 1.

Referring to FIGS. 3 and 4, there are two imaginary parallel reference planes 9 each of which passes at a distance from the axis of the drill screw. The flute 7 includes a cutting surface 10, a first drag surface 11 and a second drag surface 12. The cutting surface 10 is defined by the reference plane 9 located adjacent thereto. The first drag surface 11 intersects at an obtuse angle with the reference plane 9 located adjacent thereto such that their intersection extends axially of the drill screw. The second drag surface 12 intersects with another reference plane 9 as well as with the first drag surface 11, the second drag surface extending up to the edge along which the cutting lips 8 meet. By virtue of the provision of the second drag surface 12 a chisel edge 13 is formed in the cutting lips 8.

As best shown in FIG. 3 the cutting surface 10 has an inwardly concave bottom, a cutting edge 14 in front and a cutting blade 15 at one side. The cutting edge 14 and blade 15 are located on the reference plane 9, and form rake angles $d_1$ and $d_2$ against the cutting surface 10, respectively.

The reference numeral $1_a$ indicates a cylindrical blank from which the threaded stem 1 and the drill bit 3 are shaped in one piece. When the blank is compressed in a die as described below, lands 16 are formed in opposite places against the cutting surfaces 10. Each land is trapezoidal in cross-section, and by virtue of this trapezoidal shape the cutting blade 15 can acutely protrude from the periphery of the blank 1a. Another advantage is that the cutting blade 15 is relieved at its back 17 in the direction in which the drill screw is turned. In addition, an extremely acute edge 18 is formed at the intersection of the cutting edge 14 and the cutting blade 15 as shown in FIG. 1. The distance between the opposite cutting blades 15 is the maximum diameter (D) of the drill bit 3. As described above, the diameter (D) is between the root diameter of the threaded stem 1 and the outside diameter of the thread.

Figure 5:
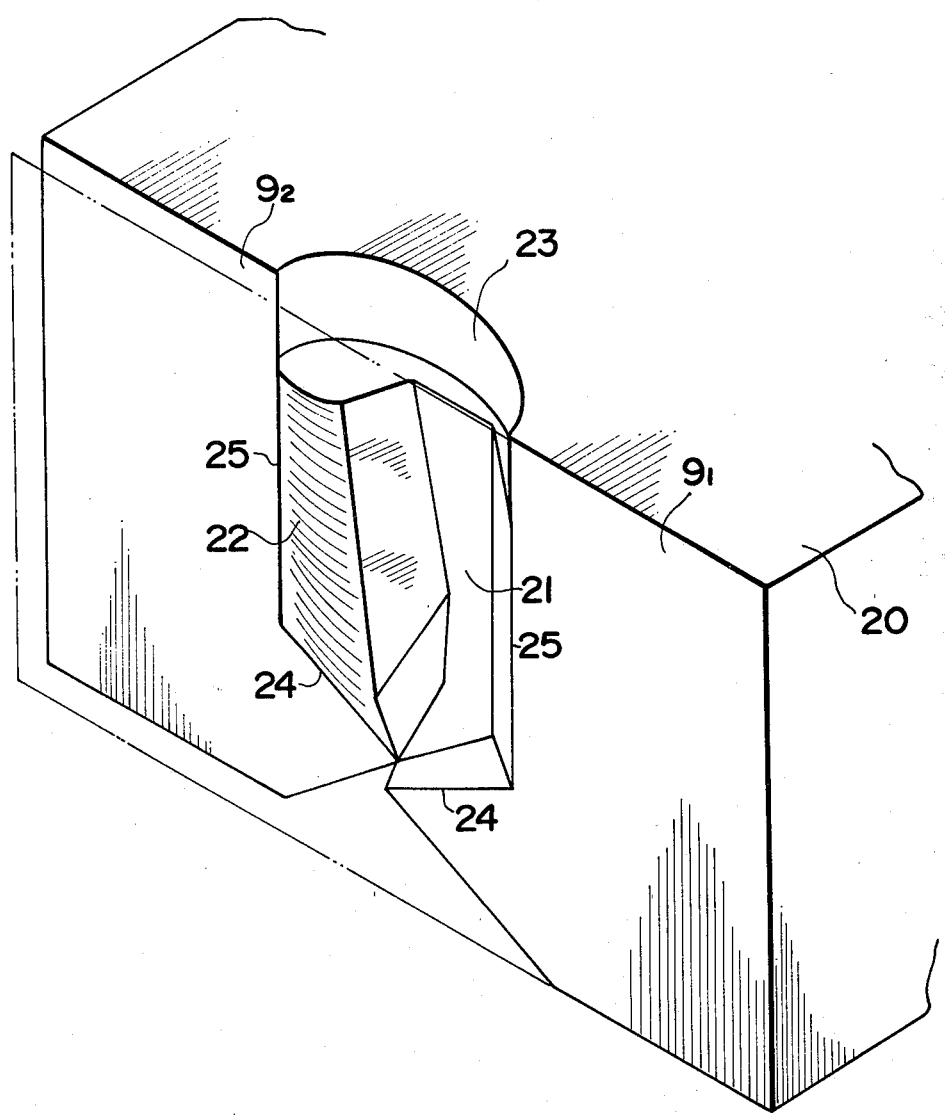
FIG. 5 is a perspective view of a die for shaping the drill screw according to the present invention.

Referring to FIG. 5 the process of shaping a drill screw will be described:

Before forming the threads 5, the driving head 2 is formed at an end of the blank 1a. Then, the drill bit 3 is shaped at the opposite end by pinch pointing or forging with the use of dividable dies, which are symmetrically constructed. The reference numeral 20 indicates a halved die adapted to shape the symmetrical half of the drill bit 3. The die 20 has two cut faces $9_1$ and $9_2$ which are in parallel with each other, but the cut face $9_2$ is slightly withdrawn with respect to the cut face $9_1$. As shown in FIG. 5, the die 20 has a die cavity in which a hill 22 and valleys 21 and 23 are produced. The valley 21 is concave with respect to the level of the cut face $9_1$, and conforms to the shape of the cutting lips 8 and the lands 16. The hill 22 is convex with respect to the cut face $9_2$ and conform to the shape of the cutting surface 10. The cutting edge 14 and the cutting blade 15 are shapped by edges 24 and 25 which define the opening of the die cavity, and the edges 24 and 25 are located on the cut faces $9_1$ and $9_2$. A semi-circular concave 23 is produced so as to support the cylindrical blank 1a when the same is compressed in the die.

What is claimed is:

1. A drill screw comprising an elongated threaded stem having a driving head at one end and a drill bit at the opposite end thereof, said drill bit including at least two flutes equally spaced from each other around a central axis of the stem, each flute having a cutting edge at a forward edge thereof to be inclined rearwardly from an inward end of the cutting edge to an outward end thereof, a cutting blade at a side edge of the flute extending parallel to the central axis of the stem and a cutting surface located inside both said cutting edge and said cutting blade and having a concave bottom, said cutting edge and said cutting blade being located in an imaginary reference plane parallel to a plane extending radially outwardly from the central axis of the stem and having acute rake angles extending toward the concave bottom of the cutting surface.

2. A drill screw according to claim 1, in which said drill bit is provided with two flutes situated symmetrically with respect to the central axis of the stem.

3. A drill screw according to claim 2, in which each flute further includes a chisel edge at the inward end of the cutting edge extending over the central axis of the stem so that the drill screw can be easily operated.

4. A drill screw according to claim 3, in which said drill bit further includes lands situated behind each cutting surface, each land having a back at one side and at least one drag surface at the opposite side thereof, said drag surface extending from the cutting surface of the adjacent flute to smoothly remove chips cut by the cutting edge and the cutting blade of the adjacent flute.

5. In a drill screw comprising an elongated threaded stem having a driving head at one end and a drill bit at the opposite end thereof, said drill bit including two flutes symmetrically situated relative to a central axis of the stem, each flute having a cutting edge at a forward edge, a cutting blade at a side edge and a cutting surface having a concave bottom located inside the cutting edge and the cutting blade, the improvement comprising said cutting edge being straight and inclined rearwardly from an inward end toward an outer end thereof, said cutting blade being straight and extending from the outer end of the cutting edge toward a driving head rearwardly parallel to the central axis of the stem, said cutting edge and said cutting blade being located in an imaginary reference plane parallel to a plane extending radially outwardly from the central axis of the stem and having acute rake angles extending toward the concave bottom of the cutting surface.

6. In a drill screw according to claim 5, in which each flute further includes a chisel edge at the inward end of the cutting edge extending over the central axis of the stem so that the drill screw can be easily operated.

* * * * *